United States Patent
Fender (10) Patent No.: US 8,181,130 B1
(45) Date of Patent: May 15, 2012

(54) METHOD FOR JITTER REDUCTION BY SHIFTING CURRENT CONSUMPTION

(75) Inventor: Joshua David Fender, East York (CA)

(73) Assignee: Altera Corporation, San Jose, CA (US)

( * ) Notice: Subject to any disclaimer, the term of this patent is extended or adjusted under 35 U.S.C. 154(b) by 236 days.

(21) Appl. No.: 12/564,654

(22) Filed: Sep. 22, 2009

(51) Int. Cl.
*G06F 17/50* (2006.01)

(52) U.S. Cl. ......... 716/103; 716/101; 716/108; 375/371

(58) Field of Classification Search .................. 716/101, 716/103, 108; 375/371
See application file for complete search history.

(56) References Cited

U.S. PATENT DOCUMENTS

| | | | | |
|---|---|---|---|---|
| 5,452,333 A * | 9/1995 | Guo et al. | ...................... | 375/371 |
| 6,081,656 A * | 6/2000 | Witt | .............. | 716/103 |
| 6,807,660 B1 * | 10/2004 | Frenkil | ......................... | 716/109 |
| 7,225,421 B2 * | 5/2007 | Migatz et al. | ................... | 716/114 |
| 7,805,697 B2 * | 9/2010 | Wood | ............................ | 716/113 |
| 7,945,880 B1 * | 5/2011 | Albrecht et al. | ............... | 716/105 |
| 2005/0251775 A1 * | 11/2005 | Wood | ............................ | 716/10 |

* cited by examiner

*Primary Examiner* — Naum Levin
(74) *Attorney, Agent, or Firm* — Womble Carlyle Sandridge & Rice LLP (57) ABSTRACT

A method for jitter reduction in a path of an integrated circuit design is presented. The path is first analyzed to identify a combinatorial logic element bounded between a source element and a destination element. The arrival time of the input signal to the combinatorial logic element is shifted by inserting a logic element at the input of the combinatorial logic element. The insertion of the logic element is performed such that the arrival time of a signal to the input of the inserted logic element occurs before half of a clock cycle and the propagation time of the input signal from the inserted logic element to the destination element is less than half the clock cycle. The modified netlist of the path of the integrated circuit incorporating the inserted logic element is stored in memory of a computing system.

18 Claims, 7 Drawing Sheets

METHOD FOR JITTER REDUCTION BY SHIFTING CURRENT CONSUMPTION

BACKGROUND

As interface speeds increase, jitter in integrated circuits is consuming an increasing portion of timing margins. Minimizing jitter is a significant design consideration. Jitter is manifested as the peak to peak noise, i.e. voltage fluctuation, on a signal. One cause of jitter is noise on the voltage supply rails. Noise on the voltage supply rails is often traced back to variation in the current consumption by on-die components. Circuits consume dynamic power whenever logic toggles, i.e., change values between 0 and 1, and most of the current consumption occurs during toggling. When the current consumption increases during toggling, the power supply voltage tends to fall. After toggling, the current consumption decreases and the power supply voltage eventually reverts back to the specified voltage. Typical current transients are significantly faster than the time constant of the power distribution network of the integrated circuit. This means that the current through the supply inductance will not change quickly enough in response to a loading change in the circuit to prevent either a voltage sag or a voltage spike. A high frequency ripple can be seen to occur at the clock rate of the circuit in response to the increased current consumption immediately after toggling.

The control of jitter is currently being addressed primarily through the use of decoupling capacitors. An increasing amount of die area is spent accommodating the decoupling capacitors used to limit the magnitude of voltage fluctuation on the power supply in an effort to reduce the amount of jitter. Any software techniques that can minimize the amount of jitter would have the benefit of reducing jitter with reduced area overhead.

It is in this context that embodiments of the invention arise.

SUMMARY

Broadly speaking, the present invention fills these needs by providing a method and apparatus for reducing jitter in an integrated circuit. It should be appreciated that the present invention can be implemented in numerous ways, including as a method, a system, or a device. Several inventive embodiments of the present invention are described below.

In accordance with one aspect of the invention, a method for jitter reduction in an integrated circuit design is detailed. A path is first analyzed to identify a combinatorial logic element bounded between a source element and a destination element. The arrival time of the input signal to the combinatorial logic element is shifted by inserting a logic element at the input of the combinatorial logic element. The insertion of the logic element is performed such that the arrival time of a signal to the input of the inserted logic element occurs before half of a clock cycle and the propagation time of the input signal from the inserted logic element to the destination element is less than half a clock cycle. The modified netlist of the path of the integrated circuit incorporating the inserted logic element is stored in memory of a computing system.

In accordance with another aspect of the invention, a method for reduction of peak-to-peak noise in an integrated circuit design is provided. The integrated circuit design is partitioned into a plurality of sub-circuits based on the frequency of operation. Sub-circuits with a combinatorial logic element bounded by a source element and a destination element are identified and the current consumption of the sub-circuits analyzed. A location within the sub-circuit where a maximum amount of current consumption of the combinatorial logic element is shifted to a second half of a clock cycle of the sub-circuit is identified and the integrated circuit design with a modified sub-circuit is stored in memory of a computing system.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

The following embodiments describe an apparatus and method for reducing jitter in an integrated circuit. It will be obvious, however, to one skilled in the art, that the present invention may be practiced without some or all of these specific details. In other instances, well known process operations have not been described in detail in order not to unnecessarily obscure the present invention.

One method of reducing jitter in an integrated circuit is to reduce the magnitude of current consumption at any given time. If current consumption can be stretched out in time, the amount of current fluctuation would be reduced. This reduction in current consumption would lead to a corresponding reduction in voltage deviations. The present invention involves shifting dynamic current in a synchronous circuit by delaying when logic toggles, while leaving the average current consumption substantially unchanged. Embodiments described below implement design transformations to shift the current consumption of combinatorial logic to a later time of the clock period while leaving the functional behavior of the circuit unchanged.

Figure 1:
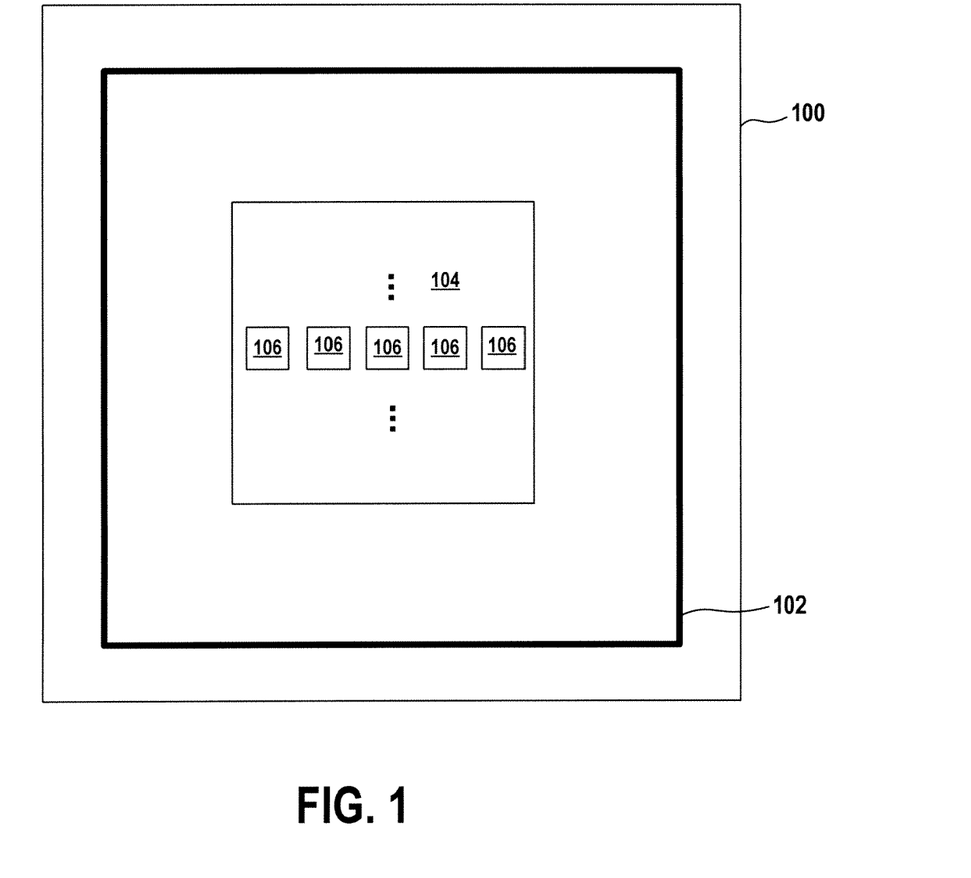
FIG. 1 is a simplified schematic diagram illustrating a high level overview of an integrated circuit containing the modified circuits minimizing jitter in accordance with one embodiment of the invention.

FIG. 1 is a simplified schematic diagram illustrating a high level overview of an integrated circuit containing the modified circuits minimizing jitter in accordance with one embodiment of the invention. Integrated circuit (IC) 100 is provided with a core region 104 and an input/output ring 102. In one embodiment, the integrated circuit 100 is a programmable logic device, such as a field programmable gate array, or application specific integrated circuit. In another embodiment, the integrated circuit 100 is a processor. The core region 104 includes a plurality of logic units 106. It should be appreciated that any configuration of the logic units 106 may be provided. That is the logic units 106 may be grouped in one area or distributed throughout the core region 104. In addition to the core region 104 may further include random access memory and additional logic, such as digital signal processing. In addition, further logic besides digital signal processing may be provided within core region 104, as FIG. 1 is exemplary and not meant to be limiting.

Figure 2:
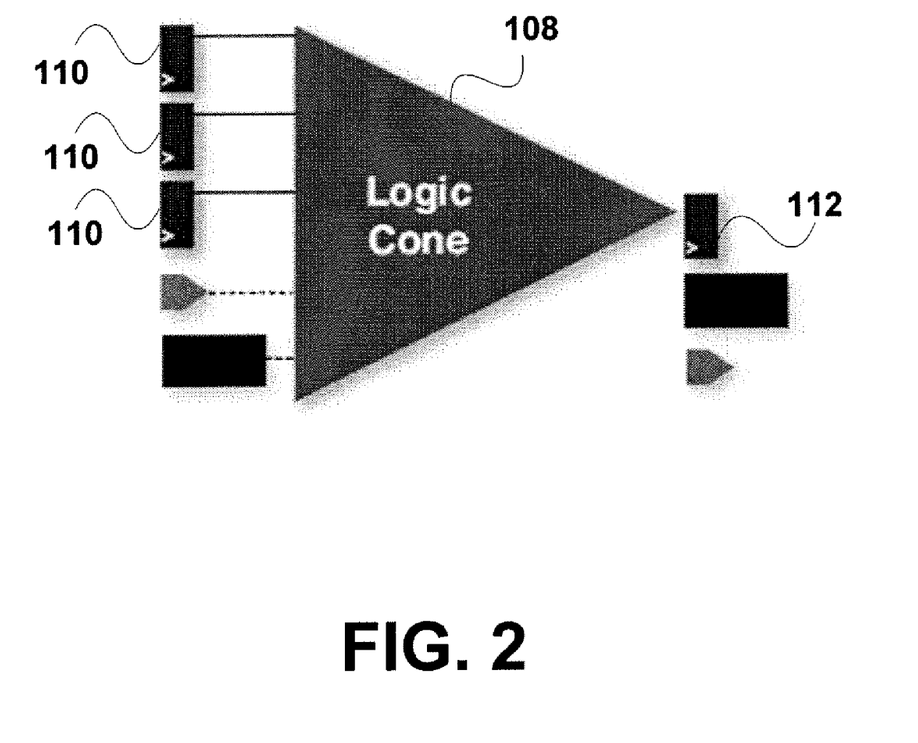
FIG. 2 illustrates an exemplary high level illustration of a logic cone contained in a logic element in accordance with one embodiment of the present invention.

FIG. 2 illustrates an exemplary high level illustration of a logic cone contained in a logic element in accordance with one embodiment of the present invention. At the design level, logic units 106 in the core region may be divided into sub-circuits or logic cones 108, which are small groups of logic bounded by elements 110 and 112, which are clocked by the same clock. In one embodiment, the bounding elements 110 and 112 are sequential elements such as registers, which may be referred to as source logic elements 110 and destination logic elements 112. In another embodiment, logic cones 108 consist of combinatorial logic elements, where the output is a function of the input at a given time.

According to an embodiment of the present invention, a design methodology for reducing jitter in a logic cone 108 involves shifting the time in which transient current consumption occurs. Shifting the current consumption can be achieved through the insertion of logic elements in existing register-to-register paths, where the output from the inserted logic elements is clocked at half a clock cycle from the original timing. Candidate locations for logic element insertion can be identified from he logic cones 108 that have significant dynamic power consumption and that have a significant amount of current consumption that can be shifted from the first half of the clock cycle to the second half of the clock cycle. In one embodiment, a delay in toggling of the combinatorial logic in the logic cone 108 may be implemented by inserting a negative edge triggered register in paths that have available time margin, so that a portion of the dynamic current consumption of the path is shifted by half a clock cycle.

Figure 3:
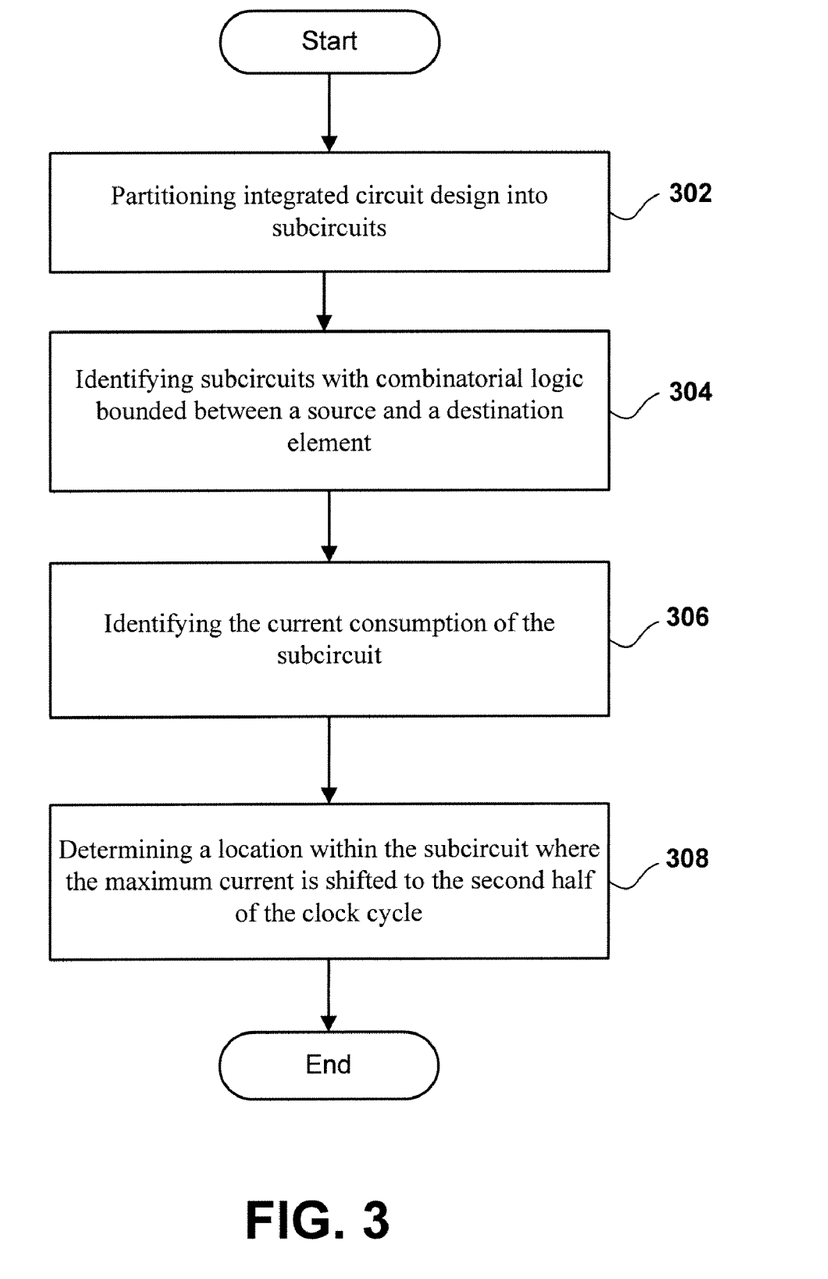
FIG. 3 is a flow chart illustrating a method for shifting the current consumption of a sub-circuit of the integrated circuit to the second half of the clock cycle according to an embodiment of the present invention.

FIG. 3 is a flow chart illustrating a method for shifting the current consumption of a sub-circuit of the integrated circuit to the second half of the clock cycle according to an embodiment of the present invention. The duty cycle of the clock input to the bounding elements is fifty percent. In other words, the clock is high for half the clock cycle and low for the other half of the clock cycle. The method described below shifts a portion current consumption of a sub-circuit from the first half of the clock cycle to the second half of the clock cycle. Ideally the amount of current consumption during the second half of the clock cycle is approximately equal to the amount of current consumption during the first half of the clock cycle.

The method initiates with operation 302, where an integrated circuit design is partitioned into a plurality of sub-circuits based on a clock domain. In operation 304, the netlist of the IC is searched to find sub-circuits with logic cones, as shown in FIG. 2, bounded by source and destination elements. One skilled in the art will appreciate that this is implemented by reading the circuit netlist and dividing the netlist into sub-circuits for which all register-to-register transfers are between the related clock domains of the same frequency in one embodiment.

The method advances to operation 306, where the current consumption of the sub-circuit as a function of time is identified. In one embodiment, a timing driven model is used to model the current consumption of each sub-circuit, and more specifically an arrival time based model is used. Arrival time, as used herein, refers to the time it takes for the input signal transmitted from the source element to reach the node of the sub-circuit that is being evaluated. The arrival time based model for current consumption traverses through every combinatorial element in the sub-circuit and identifies the arrival times of all device nodes. The arrival times can be calculated using any of several well-known timing analysis techniques to the netlist of the sub-circuit to determine a minimum and maximum signal arrival time for the input nodes of each device.

Based on the specifics of the sub-circuit being modeled, one of several approaches may be used to calculate the current consumption as a function of time. In one embodiment, calculating the current consumption of the sub-circuit as a function of time can be determined from the average amount of current consumption of the logic element subject to a transition, and assigning the average current consumption to occur at the minimum input arrival time, as calculated above. Another method of calculating the current consumption of a sub-circuit as a function of time involves determining the average current consumption of the logic element subject to a transition and assigning the current consumption equally between the minimum arrival time and the maximum arrival time.

For each of the methods, discussed above, used to calculate the current consumption of the sub-circuit, the average current consumption of a logic element subject to a transition can be estimated using one of several methods. According to an embodiment of the present invention, the average amount of current consumption for the logic element experiencing various input state combinations is calculated using the estimated current consumption associated with each input state combination, and by calculating the probability that each input state combination will occur. The estimated current consumption of the logic element for each input state combination can be determined through simulation, measurements, or other appropriate methods.

In operation 308, a suitable location within the sub-circuit where the maximum amount of current can be shifted to the second half of the clock cycle is identified. In one embodiment, shifting the maximum amount of current is implemented by inserting a logic element at the input of combinatorial logic elements, where the inserted logic element may be a sequential element such as a negative edge triggered register. Several criteria can be used to determine if a node of the sub-circuit is a suitable location to shift the current consumption to the second half of the clock cycle. To evaluate candidate locations to insert the logic element, the arrival and propagation time of every node in the sub-circuit is evaluated. Propagation time, as used herein, refers to the time it takes for the input signal to be transmitted from the candidate location and be received by the destination element. Any of several well-known static timing analysis techniques can be used to calculate the arrival time and propagation time of each node of the sub-circuit. An exemplary arrival time requirement is that the arrival time of the input signal be within the first half of the clock cycle. An exemplary propagation time requirement is that the input signal transmitted from the inserted logic element is received by the destination element within the second half of the clock cycle. In other words, the logic element should be inserted in location where the input signal is stabilized at the inserted logic element within the first half of the clock cycle and be propagated from the inserted logic element to the destination element by the end of the entire clock cycle.

According to an embodiment of the present invention, all candidate locations that meet the exemplary requirements are enumerated. The enumerated candidate locations are further analyzed to determine if inserting the logic element at the node will cause a timing violation in the logic cone, as discussed below. Any candidate location from the enumerated list that would cause such a violation is culled from the list of candidate locations. The remaining candidate locations are evaluated to identify the node that can shift the greatest amount of current consumption to the second half of the clock cycle. Each candidate location in the sub-circuit is simulated with an inserted logic element, and the current consumption as a function of time is evaluated. In one embodiment, the inserted logic element is a negative edge triggered register, which is clocked at the negative, i.e. downward, edge of the first half of the clock cycle. The negative edge triggered register shifts a portion of the current consumption of the combinatorial logic when the register transmits the input signal during the second half of the clock cycle.

The combinatorial logic elements whose arrival times have changed due to the insertion of the added logic element are re-simulated to calculate updated current consumption as a function of time using the updated arrival times. The amount of current consumption before insertion of the register is subtracted from the updated amount of current consumption calculated taking the inserted register into account. This result is the amount of current consumption that is shifted from the first half of the clock cycle to the second half clock cycle. The candidate location with the largest amount of current consumption shifted is selected and the netlist of the sub-circuit is modified to include the inserted register. In one embodiment, the amount of current consumption that is shifted to the second half of the clock cycle is calculated, and candidate locations with associated amounts of shifted current consumption that exceed a specified threshold value are selected to receive an inserted logic element.

Figure 4:
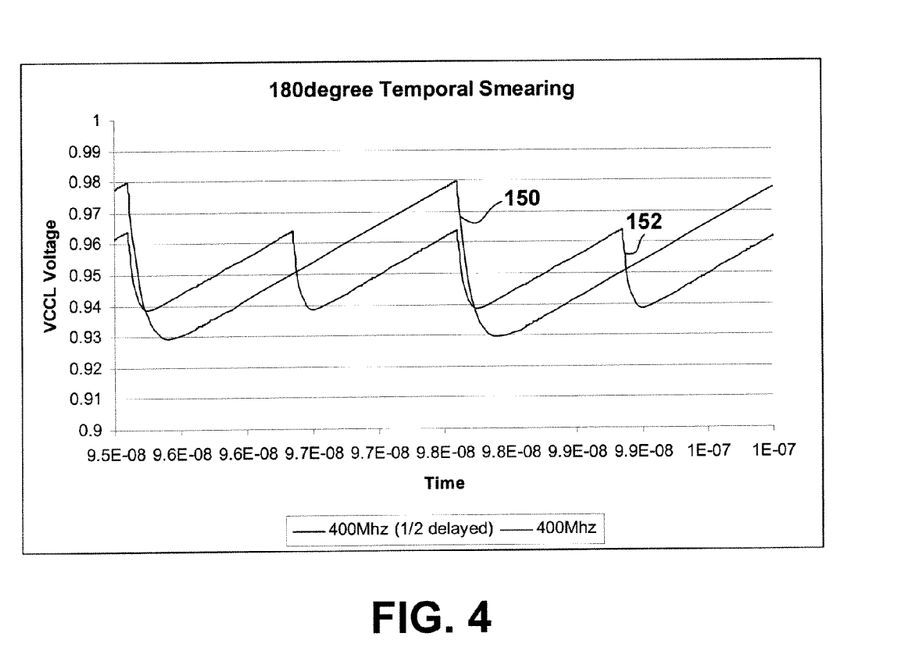
FIG. 4 illustrates a calculation of the power supply voltage as a function of time in accordance with one embodiment of the present invention.

FIG. 4 illustrates a calculation of the power supply voltage as a function of time in accordance with one embodiment of the present invention. The simulated current consumption of a circuit where substantially all the current consumption occurs in the first half of the clock phase is shown by curve 150. Curve 152 illustrates the current consumption as a function of time when a portion of the current consumption is shifted from the first half of the clock cycle to the second half of the clock cycle. It is seen while the average voltage of the two curves 150 and 152 is approximately equal, the peak to peak variation when the current consumption is shifted 152 is approximately half of the unmodified circuit 150. By shifting the current consumption, the amount current fluctuation is reduced. The reduction in current fluctuation leads to reduction of the peak to peak voltage fluctuation and the amount of jitter induced on other paths of the integrated circuit.

Figure 5:
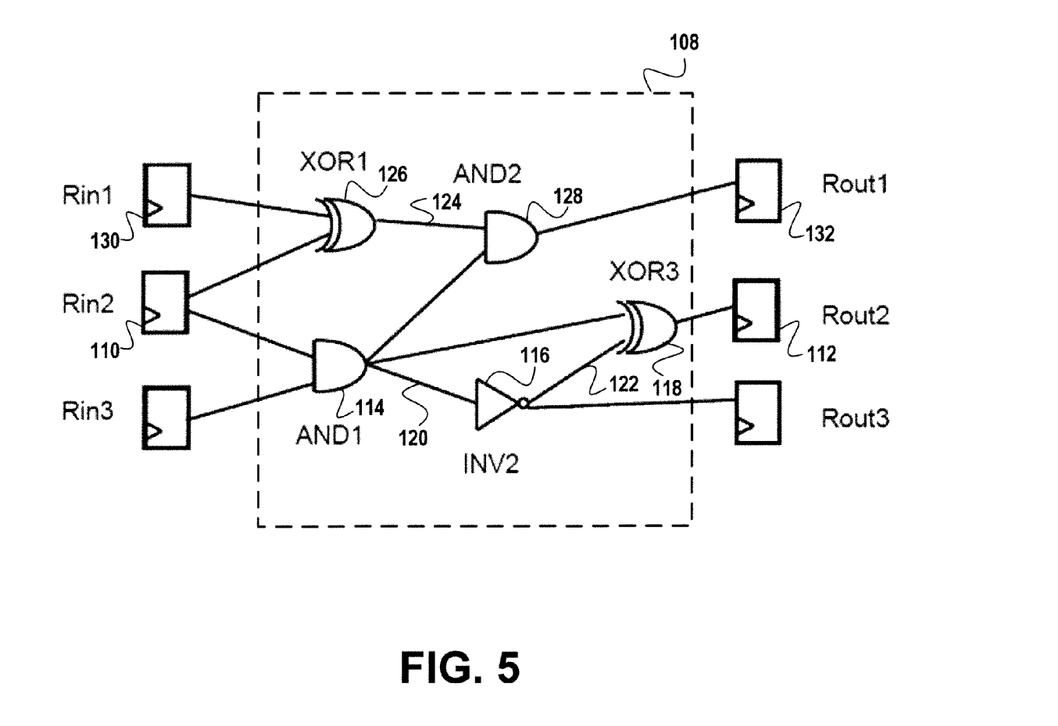
FIG. 5 illustrates an exemplary gate level schematic of a logic cone in accordance with one embodiment of the present invention.

FIG. 5 illustrates an exemplary gate level schematic of a logic cone in accordance with one embodiment of the present invention. A cone of combinatorial logic 108 is bounded by a plurality of source elements Rin1-Rin3 and a plurality of destination elements Rout1-Rout3. In one embodiment, the source and destination elements are sequential elements, whose output changes value at most once per clock cycle. In another embodiment, Rin1-Rin3 and Rout1-Rout3 correspond to elements 110 and element 112 of FIG. 2, respectively.

Referring to FIG. 3, as discussed above, the paths of the netlist are analyzed to find candidate locations where a logic element can be inserted to shift the maximum amount of current consumption by the combinatorial logic of the logic cone 108 to the second half of the clock cycle. Locations in the logic cone that meet the arrival time and propagation time requirements are selected as candidate nodes to receive an inserted register. Returning to FIG. 5, an exemplary path of the logic cone 108 including combinatorial elements 114, 116, and 118 is analyzed using an exemplary clock period of 3 time units and a delay of 1 time unit for each combinatorial element 114-116, and 120-122. For the embodiment where a negative edge triggered register is used as the inserted logic element, the signal at the input of the inserted register will be clocked through at time 1.5, i.e. the end of the first half of the clock cycle. The node 122 in this path is analyzed as a candidate location to have an inserted logic element. Assuming a logic element is inserted at node 122, the inserted logic element at node 122 has to receive the input signal within the first half the clock cycle, or 1.5 time units. The initial input from the source registers 110 reaches node 120 at time 1.0, due to the delay of the combinatorial element 114 of 1 time unit. Then from node 120, the input signal would go through element 116 and reach node 122 at time 2.0, due to the 1 time unit delay of combinatorial element 114. Based on this analysis, node 122 is not a suitable location to insert a logic element because the input signal will not arrive and stabilize at the input of the inserted element before data is clocked through when the clock signal transitions from high to low, i.e., at time 1.5.

In another exemplary analysis, candidate location 120 may be analyzed to determine if inserting a logic element at this location will meet the arrival time requirement, as described above. Based on the previous analysis, the input signal from the source registers 110 would reach node 120 at time 1.0 after the delay from combinatorial element 114. Thus, inserting a logic element at node 120 would meet the arrival time requirement. However, node 120 requires further analysis for the propagation time requirement described above, before the node 120 can be considered a viable location to have an inserted logic element.

As discussed above, it is required that the input signal transmitted from the inserted logic element at the beginning of the second half of the clock signal, i.e., time 1.5, is propagated to the destination registers by the end of the clock cycle i.e., time 3.0. Continuing the analysis of candidate location 120, at time 1.5, the inserted logic element will transmit the input signal from combinatorial element 114. The input signal is delayed by 1 time unit before being transmitted by combinatorial element 116 to node 122. Thus, at time 2.5 (time 1.5+1 time unit delay from element 116) input arrives at node 122 and after a delay of 1 time unit, combinatorial element 118 transmits the input signal to the destination registers 112. The input reaches the input of the destination register 112 at time 3.5, which violates the setup time of the destination register 112 since it is after the end of the clock cycle, i.e., 3 time units as mentioned previously. Because having an inserted logic element causes the input signal to arrive at the destination register 112 after the end of the clock cycle, node 120 is also an unsuitable location to insert a logic element.

A suitable location meeting should meet both the arrival time and the propagation time requirement. Another candidate location is on the path from source register 130 to destination register 132 that includes combinatorial elements 126 and 128. Another exemplary analysis may examine node 124 as a candidate location to insert a register between elements 126 and 128. Using the values of clock cycle and the combinatorial delay discussed previously, the input signal from the source register 130 is transmitted from combinatorial element at time 1.0 due to the 1 time unit delay from element 126. This meets the arrival time requirement since the input signal is at node 124 at time 1.0, which is before the end of the first half of the clock cycle (time 1.5). At time 1.5, the input signal is transmitted from node 120 through the inserted logic element, and after the 1 time unit delay from element 128, is received at the input of destination register 132 at time 2.5. Because this path has sufficient time margin, the input signal can arrive at the candidate location 124 before the end of the first half of the clock cycle and then be propagated from the candidate location and arrive at the destination register 132 before the end of the clock cycle. Thus, node 124 is a suitable location to receive an inserted logic element based on the exemplary arrival and propagation time requirements. The above analysis is provided for illustrative purposes, and is not meant to be limiting.

According to an embodiment of the present invention, candidate locations are further evaluated to determine if the output from the inserted logic element is connected through feedback that would cause a timing violation at another path of the logic cone. For instance, assuming the input to combinatorial logic in a different path, e.g., element 116, in FIG. 3 depends on the input signal from candidate location 124. If shifting the time when the input signal is transmitted to combinatorial element 116 causes a propagation time violation for the path, then candidate location 124 would be an unsuitable location to insert the logic element.

Figure 6:
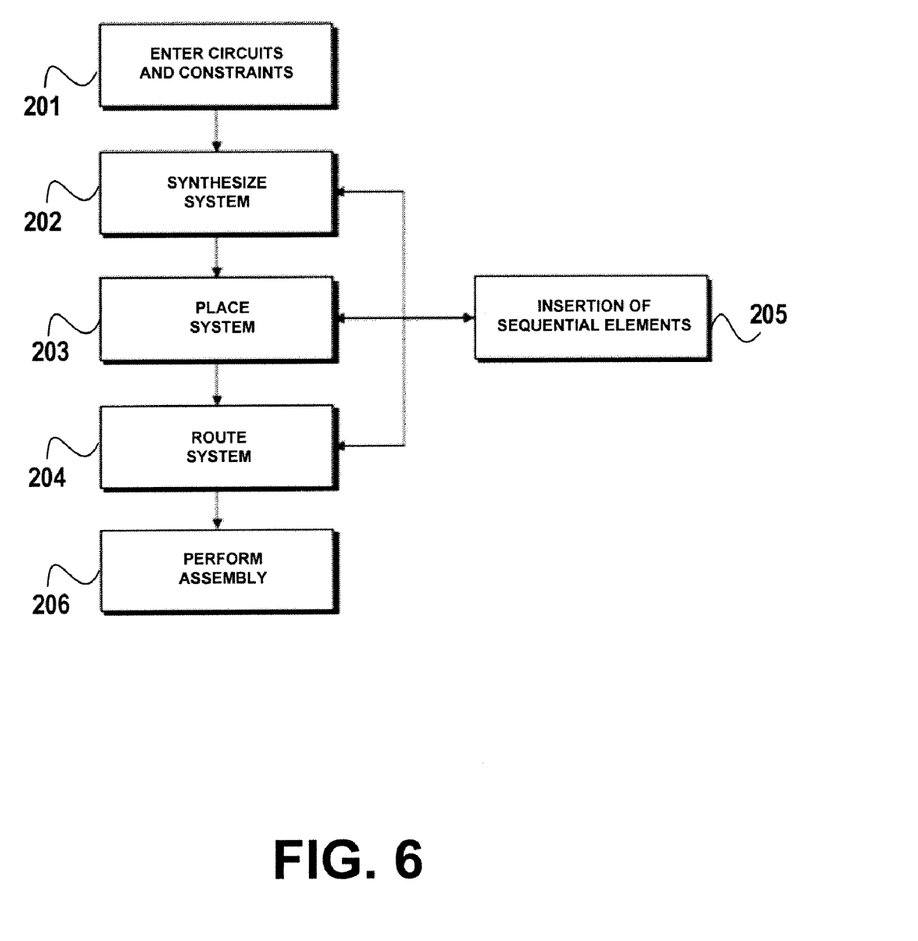
FIG. 6 illustrates the method operations involved in the design or manufacture of an integrated circuit using an electronic design automation tool in accordance with one embodiment of the present invention.

FIG. 6 illustrates the method operations involved in the design or manufacture of an integrated circuit using an electronic design automation tool in accordance with one embodiment of the present invention. It should be noted the method described in FIG. 3 may be implemented as an electronic design automation (EDA) flow executed on a EDA system. Returning to FIG. 6, the method begins with operation 201, circuit and constraint entries are made. In one embodiment, a user may specify their circuit design and constraints associated with the implementation of the system. For example, the user may provide a circuit description in a hardware description language (HDL) such as very high speed integrated circuits HDL (VHDL) or Verilog. The user may specify constraints on the implementation such as timing constraints, power budgets, or other constraints.

The method then advances to operation 202, where the system is synthesized. Synthesis includes generating a logic design of the system to be implemented by the integrated circuit. According to an embodiment of the present invention, synthesis generates an optimized logical representation of the system from a HDL design definition. The optimized logical representation of the system may include a representation that has a minimized number of functional blocks and registers, such as logic gates and logic elements, required for the system. Synthesis also includes mapping the optimized logic design. Mapping includes determining how to implement logic gates and logic elements in the optimized logic representation with specific resources on the target device. In one embodiment, a netlist is generated from the mapping.

In operation 203, the mapped logical system design undergoes placement. Placement works on the optimized technology-mapped netlist to produce a placement for each of the functional blocks. At 204 the system is routed. Routing involves determining how to connect the functional blocks in the system. The method continues to operation 205, where in reference to FIG. 3, logic elements are inserted into the system design. In one embodiment, a portion of the current consumption of the combinatorial elements in circuits of the system is shifted to the second half of the clock cycle through insertion of logic elements into specified locations in the combinatorial cones of logic. In order to preserve the original functionality of the system, suitable locations for inserted sequential elements are determined based on the arrival time and propagation time requirements of the path of the logic cone, as discussed in reference to FIG. 5. It should be appreciated that the insertion of the logic elements may be made after any one or more of the synthesis, placement, or routing operations 202-204.

In another embodiment, operation 205 identifies combinatorial logic cones of the IC to be analyzed for logic element insertion. The combinatorial logic cones are bounded by sequential elements, such as registers, which are clocked by the same clock. Candidate nodes for insertion are identified from combinatorial logic cones that have significant dynamic power and in which a significant amount of current consumption can be shifted to the second half of the clock cycle.

The logic element insertion operation 205 may further perform current consumption estimation as a function of time. The current consumption estimates may include a metric that describes the current consumption for each circuit or sub-circuit in the system design. The current consumption estimate may include an estimate of signal activities for each resource, such as a net or block, in the system design. The current consumption estimate may also include a score for each resource based on the amount of current consumption that can be shifted to the second half of the clock cycle.

At 206, an assembly operation is performed. The assembly procedure involves creating a data file or set of files that includes information determined by the procedures, including the insertion of logic elements, described by operations 201-205. The data file may be a modified netlist of the integrated circuit that is stored on a computer system. In one embodiment, the operations illustrated in FIG. 6 may be performed by an electronic design automation (EDA) tool executed on a computer system. The data file generated may be transmitted to a different computer system to allow the design of the system to be further processed. It should be appreciated that the design of the system may also be output in other forms such as on a display device or other medium.

Figure 7:
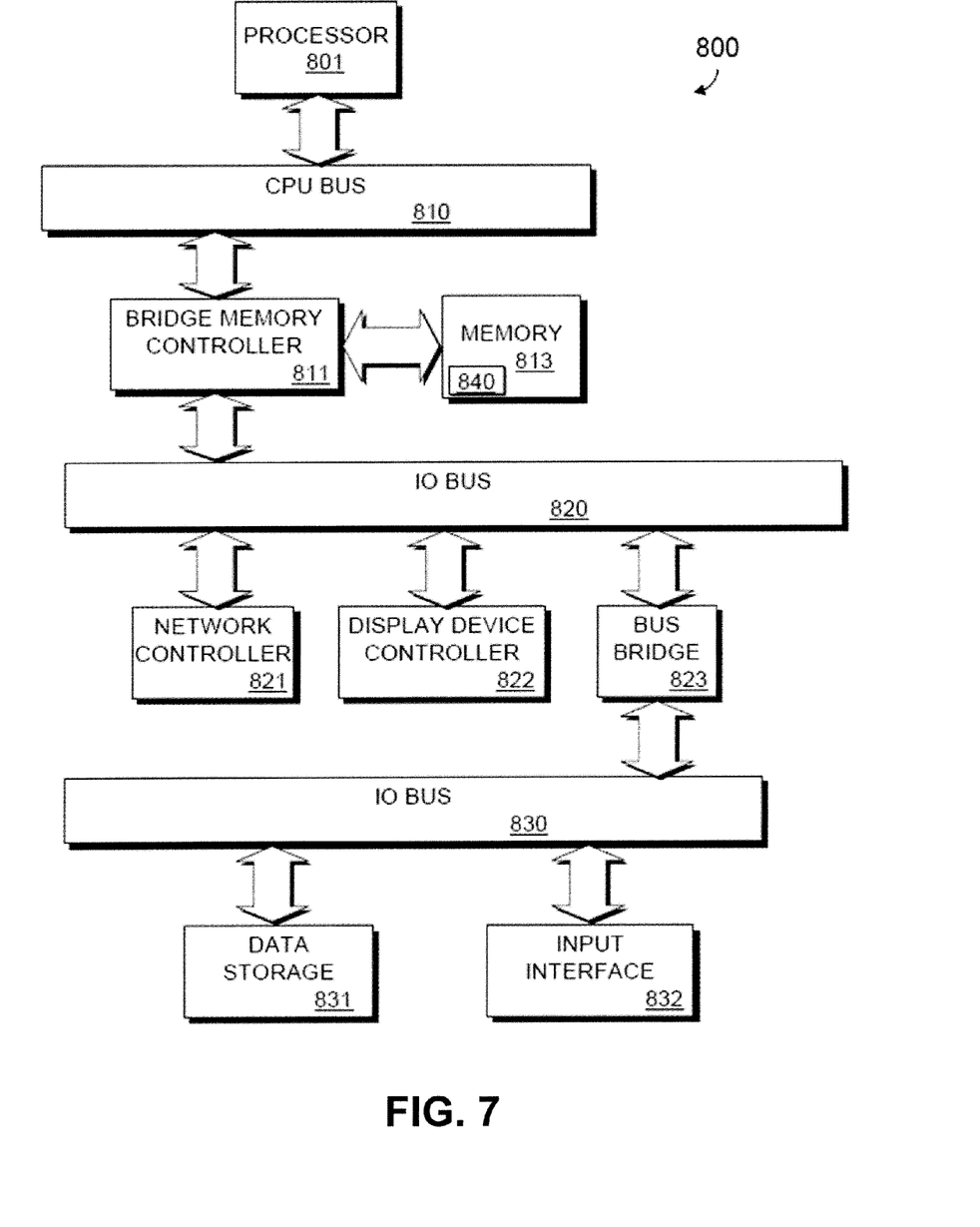
FIG. 7 illustrates a computer implemented system for designing an integrated circuit with reduced jitter in accordance with one embodiment of the present invention.

FIG. 7 illustrates a computer implemented system for designing an integrated circuit with reduced jitter in accordance with one embodiment of the present invention. The computer system 800 may be used to implement the method operations shown in FIG. 6. The computer system 800 includes a processor 801 that processes data signals. The processor 801 is coupled to a CPU bus 810 that transmits data signals between other components in the computer system 800. The computer system 800 includes a memory 813. The memory 813 may be a dynamic random access memory device, a static random access memory device, and/or other memory device. The memory 813 may store instructions and code represented by data signals that may be executed by the processor 801. A bridge memory controller 811 is coupled to the CPU bus 810 and the memory 813. The bridge memory controller 811 directs data signals between the processor 801, the memory 813, and other components in the computer system 800 and bridges the data signals between the CPU bus 810, the memory 813, and a first I/O bus 820.

The first I/O bus 820 may be a single bus or a combination of multiple buses. The first I/O bus 820 provides communication links between components in the computer system 800. A network controller 821 is coupled to the first I/O bus 820. The network controller 821 may link the computer system 800 to a network of computers (not shown) and supports communication among the machines. A display device controller 822 is coupled to the first I/O bus 820. The display device controller 822 allows coupling of a display device (not shown) to the computer system 800 and acts as an interface between the display device and the computer system 800.

A second I/O bus 830 may be a single bus or a combination of multiple buses. The second I/O bus 830 provides communication links between components in the computer system 800. A data storage device 831 is coupled to the second I/O bus 830. The data storage device 831 may be a hard disk drive, a floppy disk drive, a CD-ROM device, a flash memory device or other mass storage device. An input interface 832 is coupled to the second I/O bus 830. The input interface 832 may be, for example, a keyboard and/or mouse controller or other input interface. The input interface 832 may be a dedicated device or can reside in another device such as a bus controller or other controller. The input interface 832 allows coupling of an input device to the computer system 800 and transmits data signals from an input device to the computer system 800. A bus bridge 823 couples the first I/O bus 820 to the second I/O bus 830. The bus bridge 823 operates to buffer and bridge data signals between the first I/O bus 820 and the second I/O bus 830. It should be appreciated that computer systems having a different architecture may also be used to implement the computer system 800.

An EDA tool 840 may reside in memory 813 and be executed by the processor 801. The EDA tool 840 may operate to synthesize a system, place the system on a target device, route the system, insert logic elements into combinatorial logic in the system to identify candidate locations where a maximum amount of current consumption can be shifted to the second half of the clock cycle, and assemble data for the system design. The modified netlist from the EDA tool 840 that includes the inserted logic elements may be stored in the data storage device 831.

The method and apparatus described herein may be incorporated into any suitable circuit, including processors and programmable logic devices (PLDs). The PLDs can include programmable array logic (PAL), programmable logic array (PLA), field programmable logic array (FPLA), electrically programmable logic devices (EPLD), electrically erasable programmable logic device (EEPLD), logic cell array (LCA), field programmable gate array (FPGA), application specific standard product (ASSP), application specific integrated circuit (ASIC), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the PLDs owned by ALTERA CORPORATION.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for designing an integrated circuit, comprising:
analyzing a path to identify at least one combinatorial logic element bounded between a source element and a destination element;
shifting an arrival time of a signal to the at least one combinatorial logic element by inserting a logic element at an input of the at least one combinatorial logic element, wherein an arrival time of the signal to an input of the inserted logic element is before half of a clock cycle and a propagation time of the input signal from the inserted logic element to the destination element is less than half of the clock cycle; and storing a netlist of the path of the integrated circuit with the inserted logic element in a data storage hardware component.

2. The method of claim 1, wherein the inserted logic element is a negative edge triggered register.

3. The method of claim 1, wherein the shifting the arrival time of the signal further comprises:
identifying current consumption as a function of time using a timing driven model.

4. The method of claim 1, further comprising:
identifying the arrival time of the signal to the input of the at least one combinatorial logic; and
determining a minimum and a maximum arrival time for the signal at the input of the at least one combinatorial logic element.

5. The method of claim 3, wherein the identifying the current consumption comprises:
determining an average current consumption of the at least one combinatorial logic element experiencing a signal transition at the input; and
assigning the current consumption to occur at the minimum arrival time.

6. The method of claim 1, wherein the shifting the arrival time of the signal further comprises:
updating a current consumption as a function of time for the path with the inserted logic element.

7. The method of claim 1, wherein the inserting the logic element further comprises:
simulating a current consumption as a function of clock phase in the path with the inserted logic element; and
identifying a location such that the inserted logic element shifts a maximum amount of current to a second half of the clock cycle.

8. The method of claim 7, wherein the simulating the current consumption in the path with the inserted logic element further comprises:
identifying nodes where the arrival time is altered by addition of the inserted logic element; and
evaluating the current consumption of the identified nodes using an updated arrival time.

9. The method of claim 7, wherein shifting a maximum amount of current reduces jitter induced on other paths of the integrated circuit.

10. A non-transitory machine-readable storage medium encoded with sequences of instructions for designing an integrated circuit design, the sequences of instructions which when executed, cause a machine to perform:
analyzing a path to identify at least one combinatorial logic element bounded between a source element and a destination element;
shifting an arrival time of a signal to the at least one combinatorial logic element by inserting a logic element at an input of the at least one combinatorial logic element, such that an arrival time of the signal to an input of the inserted logic element is before half of a clock cycle and a propagation time of the input signal from the inserted logic element to the destination element is less than half the clock cycle; and
storing a netlist of the path of the integrated circuit with the inserted logic element in memory storage.

11. The non-transitory machine readable medium of claim 10, wherein the inserted logic element is a negative edge triggered register.

12. The non-transitory machine readable medium of claim 10, wherein the shifting the arrival time of the signal further comprises:
identifying current consumption as a function of time using a timing driven model.

13. The non-transitory machine readable medium of claim 12, wherein the identifying the current consumption as the function of time further comprises:
determining an average current consumption of the identified combinatorial logic element experiencing a signal transition at the input; and
assigning the current consumption to occur at the minimum arrival time.

14. The non-transitory machine readable medium of claim 10, further comprising:
identifying the arrival time of the signal to the input of the at least one combinatorial logic; and
determining a minimum and a maximum arrival time for the signal at the input of the at least one combinatorial logic element.

15. The non-transitory machine readable medium of claim 10, wherein the shifting the arrival time of the signal further comprises:
updating the current consumption as a function of time for the path with the inserted logic element.

16. The non-transitory machine readable medium of claim 10, wherein the inserting the logic element further comprises:
simulating the current consumption as a function of clock phase in the path with the inserted logic element; and
identifying a location such that the logic element shifts a maximum amount of current to a second half of the clock cycle.

17. The non-transitory machine readable medium of claim 16, wherein the simulating the current consumption in the path with the inserted logic element further comprises:
identifying nodes where the arrival time is altered by addition of the inserted logic element; and
evaluating the current consumption of the identified nodes using an updated arrival time.

18. The non-transitory machine readable medium of claim 16, wherein shifting a maximum amount of current reduces jitter induced on other paths of the integrated circuit design.

* * * * *